(12) United States Patent
Ban et al.

(10) Patent No.: US 8,306,660 B2
(45) Date of Patent: Nov. 6, 2012

(54) DEVICE AND A METHOD FOR RESTORING POSITIONAL INFORMATION OF ROBOT

(75) Inventors: Kazunori Ban, Minamitsuru-gun (JP); Gang Shen, Minamitsuru-gun (JP); Kyouhei Kokubo, Minamitsuru-gun (JP)

(73) Assignee: Fanuc Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/116,463

(22) Filed: May 26, 2011

(65) Prior Publication Data

US 2011/0295421 A1     Dec. 1, 2011

(30) Foreign Application Priority Data

Jun. 1, 2010   (JP) ................................. 2010-126148

(51) Int. Cl.
    *G05B 19/18*     (2006.01)
(52) U.S. Cl. .............. 700/254; 700/57; 700/58; 700/59; 700/245; 700/259
(58) Field of Classification Search .................... 700/57, 700/58, 59, 62, 64, 245, 250, 253, 254, 258, 700/259, 262; 356/138; 318/568.11, 568.16, 318/568.19, 568.22, 568.24; 901/9, 14–18
See application file for complete search history.

(56) References Cited

U.S. PATENT DOCUMENTS

| | | | |
|---|---|---|---|
| 5,083,073 A | 1/1992 | Kato | |
| 6,043,877 A * | 3/2000 | Land | 356/243.1 |
| 2008/0004750 A1 | 1/2008 | Ban et al. | |

FOREIGN PATENT DOCUMENTS

| | | |
|---|---|---|
| DE | 256848 A1 | 5/1988 |
| DE | 19924511 A1 | 12/2000 |
| DE | 60018421 T2 | 7/2005 |
| JP | 63-278787 | 11/1988 |
| JP | 05-038688 A | 2/1993 |
| JP | 2005-177962 | 7/2005 |
| JP | 2005177962 A * | 7/2005 |
| JP | 2008-188705 A | 8/2008 |
| JP | 2009-285778 A | 12/2009 |

\* cited by examiner

*Primary Examiner* — Khoi Tran
*Assistant Examiner* — Spencer Patton
(74) *Attorney, Agent, or Firm* — Drinker Biddle & Reath LLP

(57) ABSTRACT

A device for restoring positional information of a robot provided with a first member and a second member; a motor moving the second member; and a sensor outputting a sensor signal. The device includes an imaging section obtaining an image signal in a region including a first mark and a second mark; a mark position computation section computing a first positional relationship between the first mark and the second mark at a first time and a second positional relationship at a second time, based on an image signal obtained by the imaging section at the first time and at the second time; and a correction section correcting positional information depending on a sensor signal, based on the first and second positional relationship, a first sensor signal output by the sensor at the first time and a second sensor signal output by the sensor at the second time.

6 Claims, 11 Drawing Sheets

Fig.9A
Fig.9B
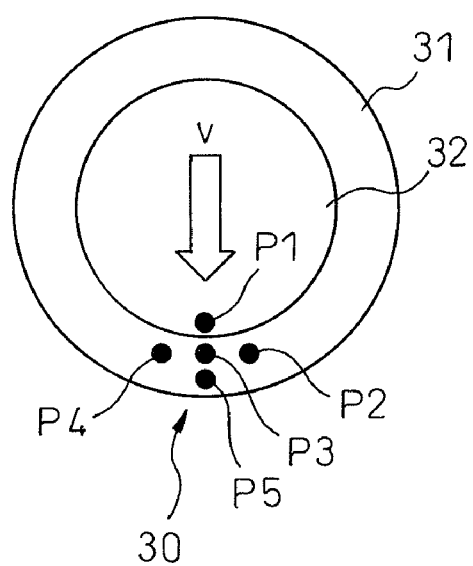
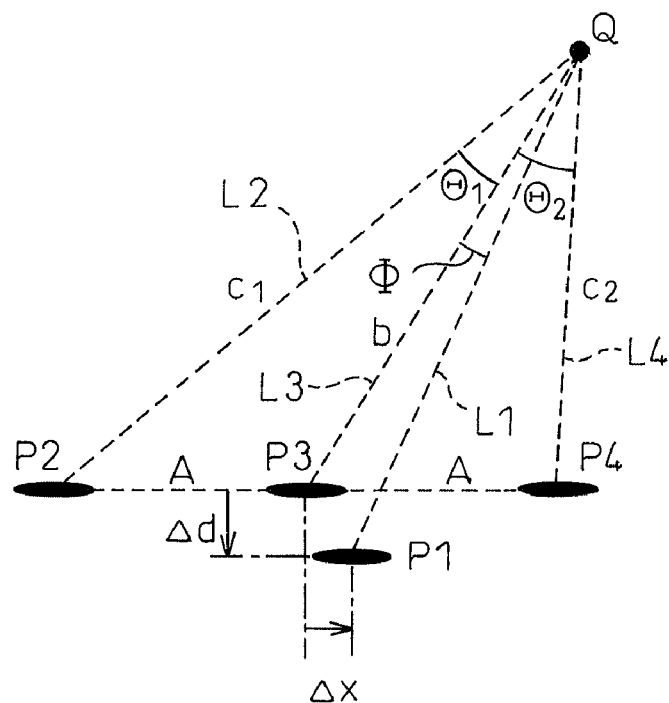

DEVICE AND A METHOD FOR RESTORING POSITIONAL INFORMATION OF ROBOT

RELATED APPLICATION DATA

This application claims priority under 35 U.S.C. §119 and/or §365 to Japanese Application No. 2010-126148 filed June 1, 2010, the entire contents of which is incorporated herein by reference.

BACKGROUND OF THE INVENTION

1. Field of the Invention

The present invention relates to a device and a method for restoring positional information of a robot, in which positional information with respect to a reference position of an articulation axis of the robot is restored.

2. Description of the Related Art

A robot with an articulation axis rotated by a motor driving typically includes a sensor outputting a sensor signal according to a motor driving amount. After the articulation axis of the robot is positioned at a reference position, a correlation between the sensor signal and an axial angle of the articulation axis is determined. Typically, this positioning is often carried out based on the fact that, when the robot is put in a predetermined orientation (position), the articulation axis is also put in a predetermined state. In order to put the robot in a predetermined orientation (position), various techniques, such as using a jig according to a structure of the robot mechanism are known. As an example, Japanese Unexamined Patent Publication No. 63-278787 (JP63-278787A) describes a method, in which a pair of structures constituting an articulation axis are provided with respective pin holes, and a pin is inserted into the respective pin holes to specify a reference position. As another example, Japanese Unexamined Patent Publication No. 2005-177962 (JP2005-177962A) describes a method, in which one of structures constituting an articulation axis is provided with a V-shaped groove and the other of structures is provided with a proximity sensor corresponding to the V-shaped groove to identify a reference position depending on a signal from the proximity sensor.

In the robot of this type, if a motor, a reduction gear coupled to the motor and the like is removed or replaced for maintenance, etc., the positional information depending on the sensor signal based on the reference position is invalidated. Therefore, in order to validate the positional information depending on the sensor signal, a positioning work and the like is necessary. However, in the method described in JP63-278787A, because the relative position of the pin holes may deviate due to an insufficient processing accuracy of the pin hole portions, an assembly error of the articulation part and the like, the positioning work is not easy and the positioning accuracy is likely to be reduced. On the other hand, in the method described in JP2005-177962A, because the proximity sensor has to be installed with respect to the direction of movement of the articulation axis with high accuracy, time and effort are necessary for the positioning thereof.

SUMMARY OF THE INVENTION

One aspect of the present invention provides a device for restoring positional information of a robot provided with a first member and a second member connected in a manner movable relative to each other via an articulation axis; a motor moving the second member relative to the first member; and a sensor outputting a sensor signal according to a driving amount of the motor, the device comprising a positional information validation section, capable of validating positional information depending on the sensor signal based on a reference position of the articulation axis, the position information having been invalidated for a reason that a component affecting a correlation between the sensor signal and a relative movement of the second member relative to the first member is removed or replaced after the correlation is determined with respect to the reference position, wherein the positional information validation section comprises: an imaging section obtaining an image signal in a region including a first mark and a second mark provided in the first member and the second member, respectively, in advance, the first mark and the second mark representing a positional relationship between the first member and the second member; a mark position computation section computing a first positional relationship between the first mark and the second mark at a first time before the component is removed or replaced, based on an image signal obtained by the imaging section at the first time, and computing a second positional relationship between the first mark and the second mark at a second time after the component is removed or replaced, based on an image signal obtained by the imaging section at the second time; and a correction section correcting positional information depending on a sensor signal output by the sensor after the second time, based on the first positional relationship and the second positional relationship computed by the mark position computation section as well as a first sensor signal output by the sensor at the first time and a second sensor signal output by the sensor at the second time.

Another aspect of the present invention provides a method for restoring positional information of a robot having a first member and a second member connected in a manner movable relative to each other via an articulation axis; a motor moving the second member relative to the first member; and a sensor outputting a sensor signal according to a driving amount of the motor, adapted to validate positional information depending on the sensor signal based on a reference position of the articulation axis, the position information having been invalidated for a reason that a component affecting a correlation between the sensor signal and a relative movement of the second member relative to the first member is removed or replaced after the correlation is determined with respect to the reference position, the method including a first shooting procedure for shooting a region including a first mark and a second mark provided in the first member and the second member, respectively, in advance with a camera, at the first mark and the second mark representing a positional relationship between the first member and the second member; a first computation procedure for computing a first positional relationship between the first mark and the second mark at the first time, based on an image signal obtained in the first shooting procedure; a second shooting procedure for shooting a region including the first mark and the second mark with a camera, at a second time after the component is removed or replaced; a second computation procedure for computing a second positional relationship between the first mark and the second mark at the second time, based on an image signal obtained in the second shooting procedure; and a correction procedure for correcting positional information depending on a sensor signal output by the sensor after the second time, based on the first positional relationship computed in the first computation procedure and the second positional relationship computed in the second computation procedure as well as a first sensor signal output by the sensor at the first time and a second sensor signal output by the sensor at the second time.

BRIEF DESCRIPTION OF THE DRAWINGS

The object, features and advantages of the present invention will become more apparent from the following description of embodiments taken in conjunction with the accompanying drawings, in which:

FIG. 9A is a diagram describing a specific technique for the first process of FIG. 8;

FIG. 9B is a diagram describing a specific technique for the first process of FIG. 8;

DETAILED DESCRIPTION

First Embodiment

Figure 1:
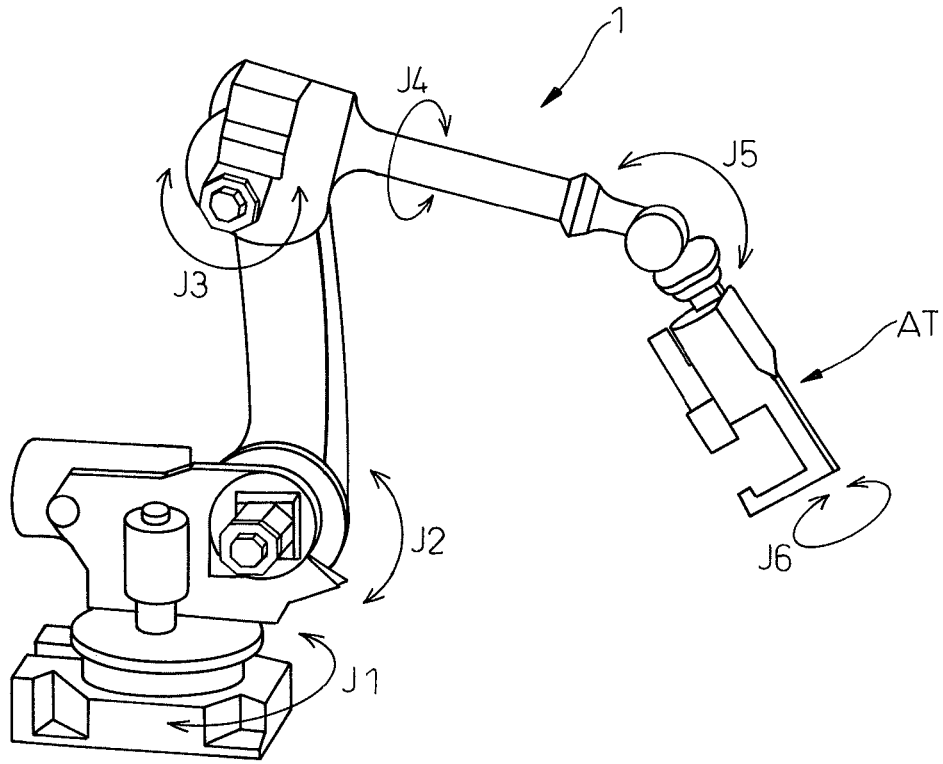
FIG. 1 is a diagram illustrating an example of an industrial robot to which a device for restoring positional information according to a first embodiment of the present invention is applied.

Hereinafter, referring to FIGS. 1 to 13B, the first embodiment of the present invention will be described. FIG. 1 is a diagram illustrating an example of an industrial robot 1 to which a device for restoring positional information according to the first embodiment of the present invention is applied.

Robot 1 in FIG. 1 is an articulated robot with six rotatable articulation axes. Rotation directions of the articulation axes are indicated by arrows J1-J6, respectively. The articulation axes of robot 1 are rotated by respective motors. By appropriately adjusting rotation amounts of the articulation axes of robot 1, a tip portion of an arm AT can be positioned at an arbitrary position and orientation.

Figure 2:
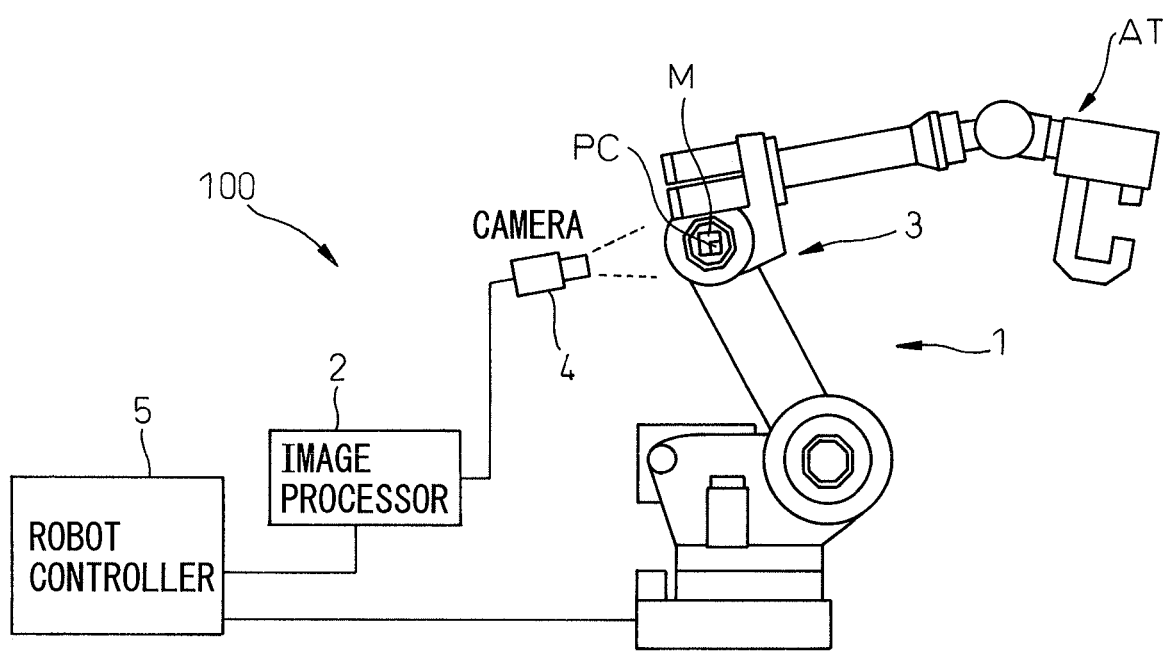
FIG. 2 is a diagram illustrating an overall configuration of a robot system including the device for restoring positional information according to the first embodiment of the present invention.

FIG. 2 is a diagram illustrating an overall configuration of a robot system including the device for restoring positional information according to the first embodiment of the present invention. Though only a portion is illustrated in the Figure, robot mechanism parts 3 each of which forms each articulation axis are equipped with respective servo motors M. Each servo motor M is integrally provided with a pulse coder PC outputting a sensor signal according to a driving amount of the motor for feedback of a rotational angle of the motor. Output axes of servo motors M are coupled to the respective articulation axes with or without reduction gears. The articulation axes may be directly driven axes. In this case, rotational motions of servo motors M are converted into linear motions by ball screws or by pulleys and timing belts and the like.

In industrial robot 1 as described above, after robot mechanism parts 3 are assembled, a work referred to as "mechanism calibration" is carried out to determine a correlation between the rotational angles (axial angles) θ1 to θ6 about each articulation axis and the positions and orientations of the arm tip portion AT:

$$(J1, J2, \ldots, J6) = (\theta 1, \theta 2, \ldots, \theta 6) \leftrightarrow (X, Y, Z, W, P, R) \qquad (I),$$

in the above equation (I), X, Y, Z are the X coordinate, the Y coordinate and the Z coordinate in the orthogonal coordinate system of the arm tip portion AT, and W, P, R are the rotational angles in the X-axis, Y-axis and Z-axis, respectively.

As an example, the mechanism calibration is carried out under the condition that each articulation axis is set in the orientation of a predetermined reference position, so that a correlation between signals of pulse coder PC (sensor signals) and axial angles θ1 to θ6 with respect to the reference position is determined. At this time, zero points (θ=0) of the axial angles θ1 to θ6 are defined, and J1 to J6 are represented with respect to the zero points. The zero points are defined, for example, at the reference position, and the sensor signals at this reference positions or, in other words, the sensor signals corresponding to the zero points are stored in memory as reference signals.

In the state in which the mechanism calibration described above has been completed, if servo motors M or the reduction gears are removed for maintenance work and the like, positional information depending on the sensor signals with respect to the zero points is changed and becomes invalid. Further, when servo motors M are replaced, respective pulse coders PC are replaced at the same time. Also in this case, the positional information depending on the sensor signals with respect to the zero points become invalid. The device for restoring positional information according to this embodiment includes a positional information validation section 100, which restores the positional information with respect to the zero points from the invalid state to the valid state, as described below.

As illustrated in FIG. 2, positional information validation section 100 includes a camera 4, an image processor 2 and a robot controller 5. Camera 4 is disposed at a position apart from robot 1. Camera 4 is, for example, an electronic camera having an imaging device such as a CCD, which is a well-known light receiving device having a function for detecting a two-dimensional image on a light receiving surface (CCD array surface) by imaging. Camera 4 is supported by a camera stand. Camera 4 captures images of a visual mark 30 (FIGS. 5A and 5B) provided in the articulation part of robot 1. An operator may hold camera 4 by hand.

Figure 3:
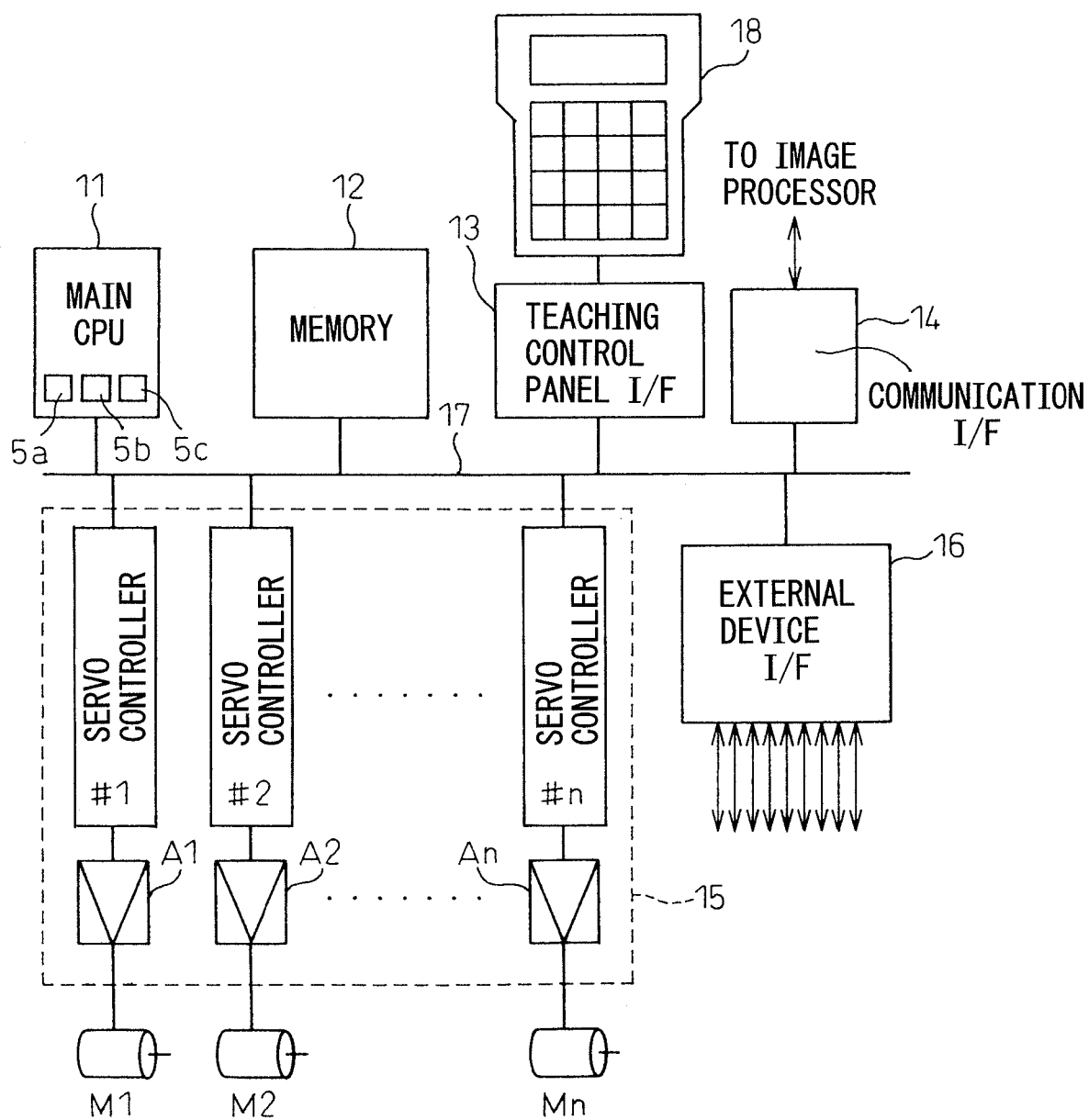
FIG. 3 is a block diagram illustrating a configuration of a robot controller of FIG. 2.

Signals from camera 4 are output to image processor 2 and, based on signals from image processor 2, robot controller 5 controls servo motors M. FIG. 3 is a block diagram illustrating a configuration of robot controller 5. Robot controller 5 is configured so that a main CPU 11 is connected to a bus 17 and bus 17 is connected to a memory 12 including a RAM, a ROM, a non-volatile memory and the like, an interface 13 for a teaching control panel, an input/output interface 16 for external devices, a servo control section 15, and a communication interface 14 in parallel. CPU 11 includes a first processing section 5a, a second processing section 5b and a correction section 5c, and these sections carry out the following processes.

Teaching control panel 18 connected to interface 13 has a typical display function. The operator manually operates this teaching control panel 18 to create, correct and register a working program of robot 1 or set various parameters, and further, input start commands and the like of a control program described below. Various control programs including this control program are stored in the non-volatile memory in memory 12.

Servo control section 15 includes servo controllers #1-#n (where n is the total number of axes of robot 1, and n=6 in this embodiment). Servo control section 15 receives movement commands generated by computation for robot control and, based on feedback signals output from pulse coders PC provided in the respective axes, outputs driving commands to servo amplifiers A1 to An. Based on the respective driving commands, servo amplifiers A1-An supply current values to servo motors M of the articulation axes to drive them. Communication interface 14 is connected to image processor 2 (FIG. 2). Start commands for imaging by camera 4, start commands for image processing and the like are output to image processor 2 via this communication interface 14 and, on the other hand, processing results by image processor 2 are input via communication interface 14.

Figure 4:
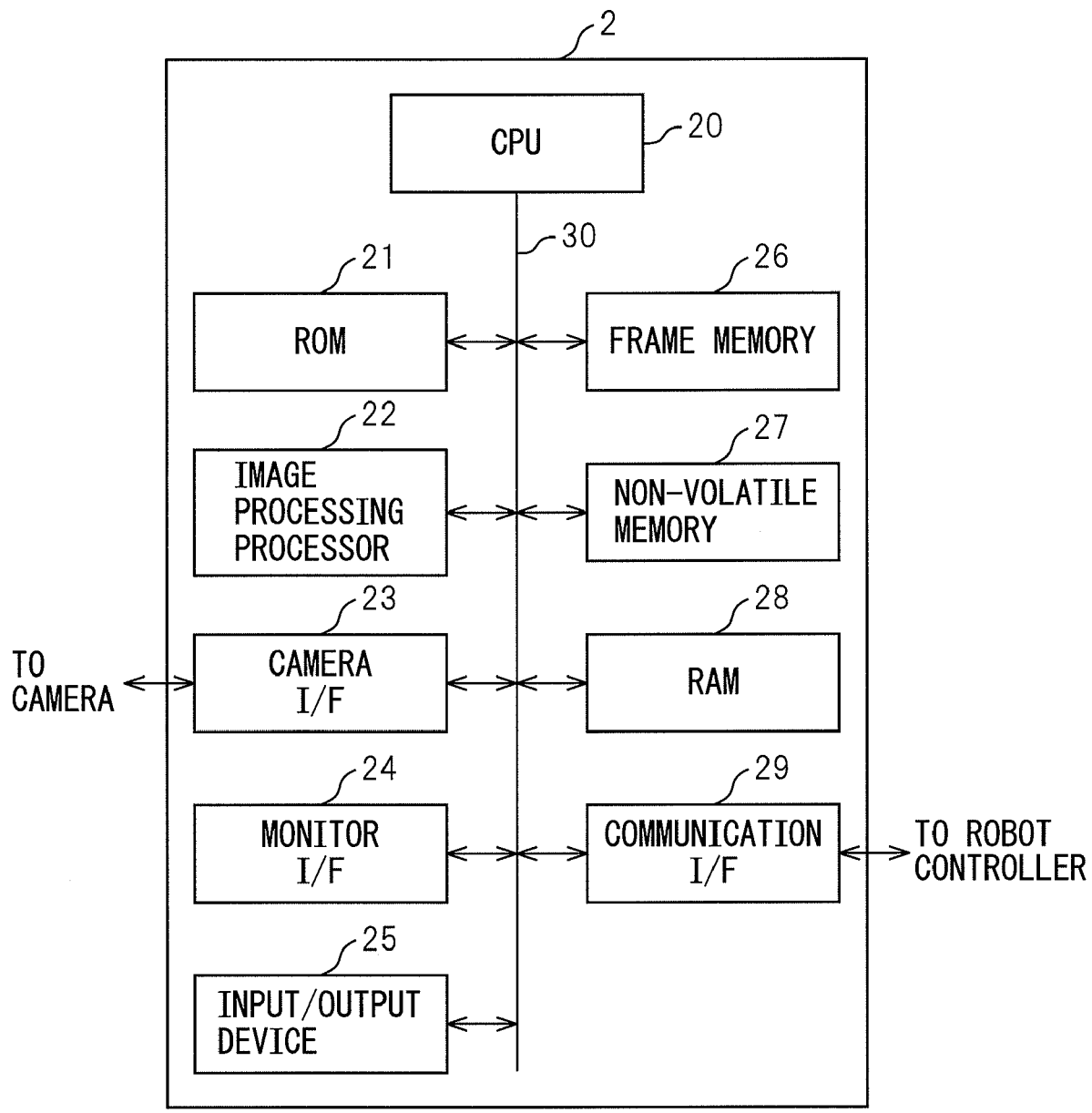
FIG. 4 is a block diagram illustrating a configuration of an image processor of FIG. 2.

Image processor 2 has a well-known block configuration illustrated in FIG. 4. That is, image processor 2 has a CPU 20 comprised of a microprocessor. CPU 20 is connected via a bus line 30 to a ROM 21, an image processing processor 22, a camera interface 23, a monitor interface 24, an input/output device (I/O) 25, a frame memory (image memory) 26, a non-volatile memory 27, a RAM 28 and a communication interface 29. Image processor 2 may be provided inside robot controller 5.

Camera interface 23 is connected to camera 4. Once imaging commands are sent to camera 4 via camera interface 23, an electronic shutter feature provided in camera 4 carries out imaging and, via camera interface 23, image signals are stored in frame memory 26 in the form of gray scale signals. Monitor interface 24 is connected to a display such as a CRT or LCD and the like as a monitor, on which an image being captured by the camera, previous images stored in frame memory 26, images processed by image processing processor 22 and the like are displayed as necessary.

Figure 5A:
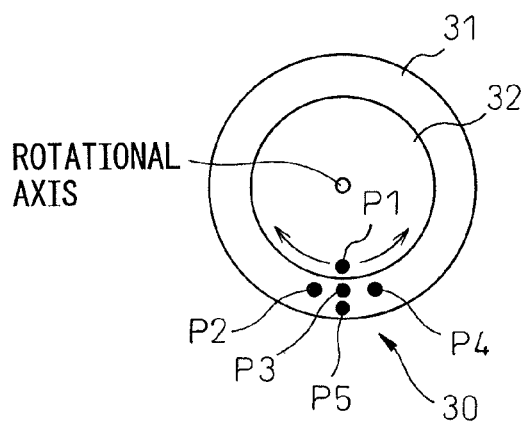
FIG. 5A is a diagram illustrating an example of visual marks provided in an articulation part.
Figure 5B:
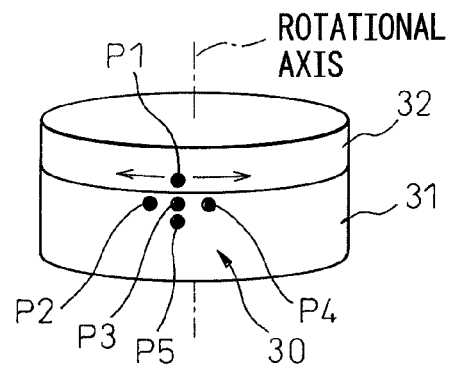
FIG. 5B is a diagram illustrating an example of visual marks provided in an articulation part.

FIGS. 5A and 5B are diagrams illustrating examples of visual marks 30 provided in the respective articulation parts. FIG. 5A illustrates the example in which mark 30 is put on a surface perpendicular to the rotational axis direction of the articulation part so that mark 30 can be viewed from the rotational axis direction. FIG. 5B illustrates the example in which mark 30 is put on a periphery surface of the rotational axis direction of the articulation part so that mark 30 can be viewed from the side of the rotational axis. In each articulation part, a movable member 32 is rotatably supported by a support member 31.

Visual mark 30 consists of five dot-marks, each of which shows a dot-like shape. These dot marks are arranged crosswise. That is, dot marks P2 and P4 are disposed equidistantly on the both sides in a horizontal direction of central dot mark P3, in the figures. Further, dot marks P1 and P5 are disposed on the both sides in a vertical direction of central dot mark P3, in the figures. Dot marks P2 to P5 are provided on support member 31, and dot mark P1 is provided on movable member 32. When movable member 32 rotates, dot mark P1 moves to the arrow directions, and therefore, the shape of visual mark 30, or a positional relationship between dot mark P1 and dot marks P2 to P5 is changed.

Figure 6A:
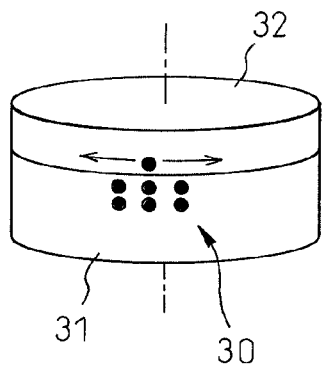
FIG. 6A is a diagram illustrating a variation of FIG. 5B.
Figure 6B:
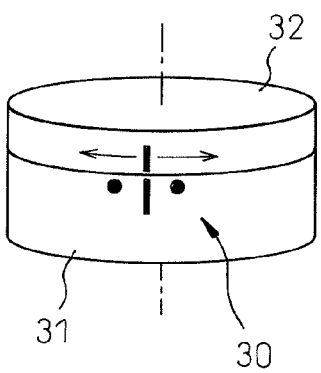
FIG. 6B is a diagram illustrating a variation of FIG. 5B.
Figure 6C:
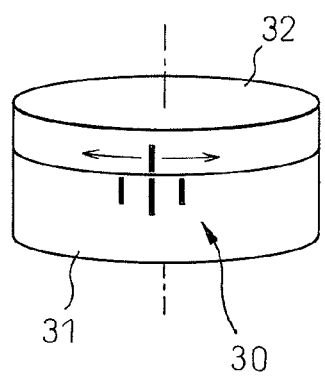
FIG. 6C is a diagram illustrating a variation of FIG. 5B.

In FIGS. 5A and 5B, visual mark 30 is configured by dot marks P1 to P5 disposed in the horizontal and vertical directions. However, so long as an individual shape constituting visual mark 30 can be detected by image processing, the configuration of visual mark 30 is not limited to that described above. FIGS. 6A to 6C are diagrams illustrating other examples of visual mark 30. In FIG. 6A, the dot marks on the support member are disposed differently from those in FIG. 5B. In FIG. 6B, some of the dot marks are replaced by bar-shaped marks. In FIG. 6C, in place of the dot marks, the bar-shaped marks are used. Visual marks 30 described above may be provided as sticker-like marks stuck on the surfaces of members 31 and 32. Alternatively, visual marks 30 may be provided as circular holes and the like machined on the surfaces of members 31 and 32.

Figure 7:
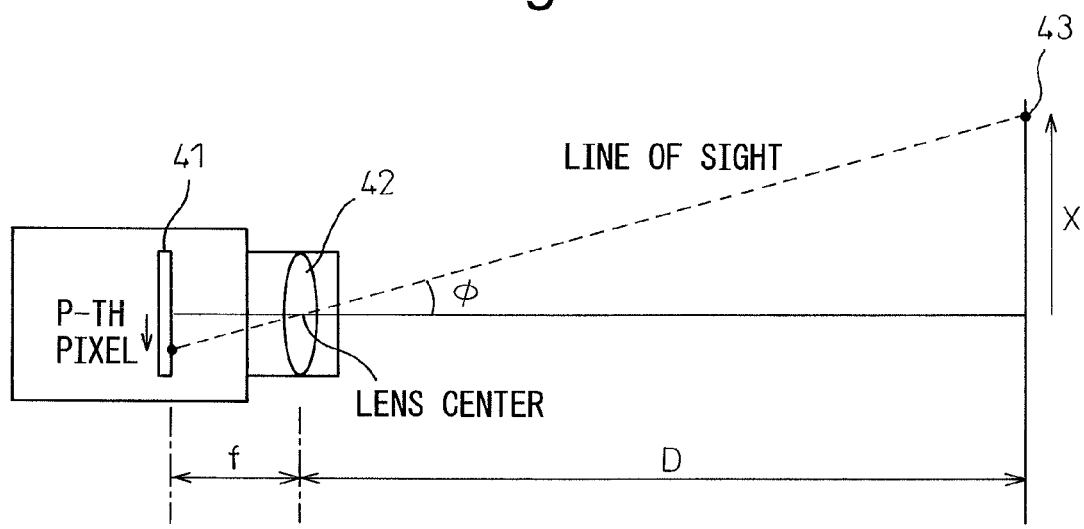
FIG. 7 is a diagram describing a calibration of a camera according to a first embodiment of the present invention.

Camera 4 for imaging visual mark 30 is calibrated in advance. The calibration is an operation for determining a relationship between an image coordinate system on the imaging device in the camera and an external coordinate system of camera 4. FIG. 7 is a diagram for describing an example of the calibration, in which a camera model on the assumption that an optical axis of the camera runs through the center of imaging device 41 and that lens 42 has no distortion is used. In this case, the number of valid pixels N of imaging device 41, the size S of imaging device 41 corresponding to valid pixels N, and a focal length f of lens 42 are used as known information items.

If the center of imaging device 41 is an origin of the image coordinate system, and an object 43 located at a position apart from the optical axis of the camera by X in the external space coordinates is imaged in the p-th pixel in the image coordinate system, the relationship of the following equation (II) is satisfied:

$$X = D \cdot S \cdot p / (f \cdot N) \quad \text{(II)}$$

D in the above equation (II) is a distance along the optical axis of the camera from the center of the lens to the object. Consequently, with respect to object 43 captured on the image coordinate system, based on the coordinate values on the image coordinate system, a direction of a line of sight connecting the optical center (lens center) of camera 4 to actual object 43, or an angle $\phi$ can be determined.

The lens of camera 4 is disposed oppositely to visual mark 30. Consequently, once object 43 is replaced by dot marks P1 to P5 of FIGS. 5A and 5B, lines of sight from the lens center to each dot mark P1 to P5 can be determined. Furthermore, once predetermined conditions are added as described below, based on these lines of sight, distances from the lens center to each dot mark P1 to P5 can be determined. In this case, when support member 31 and movable member 32 are in the relationship as illustrated in FIGS. 5B and 6A to 6C, it can be considered that there is no step height between support member 31 and movable member 32, and that all the individual shapes constituting visual mark 30 are located substantially on an identical surface. On the other hand, when support member 31 and movable member 32 are in the relationship as illustrated, for example, in FIG. 5A, there may be a step height between support member 31 and movable member 32 in the direction perpendicular to the sheet and, in this case, this step height is taken into consideration to calculate the distances to dot marks P1 to P5.

Visual mark 30 is imaged in, for example, an exposure time of 1 msec or less. With this exposure time, even when the imaging is carried out with camera 4 held by the operator's hand, a still image not affected by camera shake can be obtained.

In the first embodiment, in order to validate the positional information depending on the sensor signals with respect to the reference positions (zero points) that is invalidated due to the removal, replacement or the like of servo motors M or the reduction gears (hereinafter represented by the replacement of the motor), the articulation part including visual mark 30 is imaged before and after replacing the motor. Before this imaging, robot mechanism part 3 is assembled, and then, the mechanism calibration is carried out to set the zero point of the axial angle θn at the n-th axis (Jn). The zero point is a position where θn=0 is satisfied.

Next, at the first time before replacing the motor (for example, immediately after the mechanism calibration), the imaging command is manually output to camera 4 via robot controller 5 and image processor 2 to capture images of visual mark 30. At this time, servo motor M is manually driven to align vertical marks P1, P3 and P5 of FIGS. 5A and 5B substantially in one line so that all dot marks P1 to P5 are contained in the center portion of the imaged area. After that, visual mark 30 is imaged. In this case, camera 4 is set toward visual mark 30 and visual mark 30 is imaged once, and then, a position or orientation of camera 4 is changed and the identical visual mark 30 is imaged again. That is, visual mark 30 is imaged twice. The mechanism calibration and the imaging operation at the first time described above are carried out, for example, by the manufacturer manufacturing robot 1 when robot mechanism part 3 is manufactured.

After that, at the second time after replacing the motor, similarly to the first time, the imaging command is manually output to camera 4 to capture an image of visual mark 30. Also in this case, servo motor M is manually driven to align vertical marks P1, P3 and P5 of FIGS. 5A and 5B substantially in one line so that all dot marks P1 to P5 are contained in the center portion of the imaged area. After that, visual mark 30 is imaged. After replacing the motor, unlike before replacing the motor, visual mark 30 is imaged only once. The imaging operation at the second time described above is carried out, after robot 1 is used by general users and the work such as the replacement of the motor or reduction gear for maintenance work, that is, the work invalidating the sensor signals with respect to the zero point is carried out.

Figure 8:
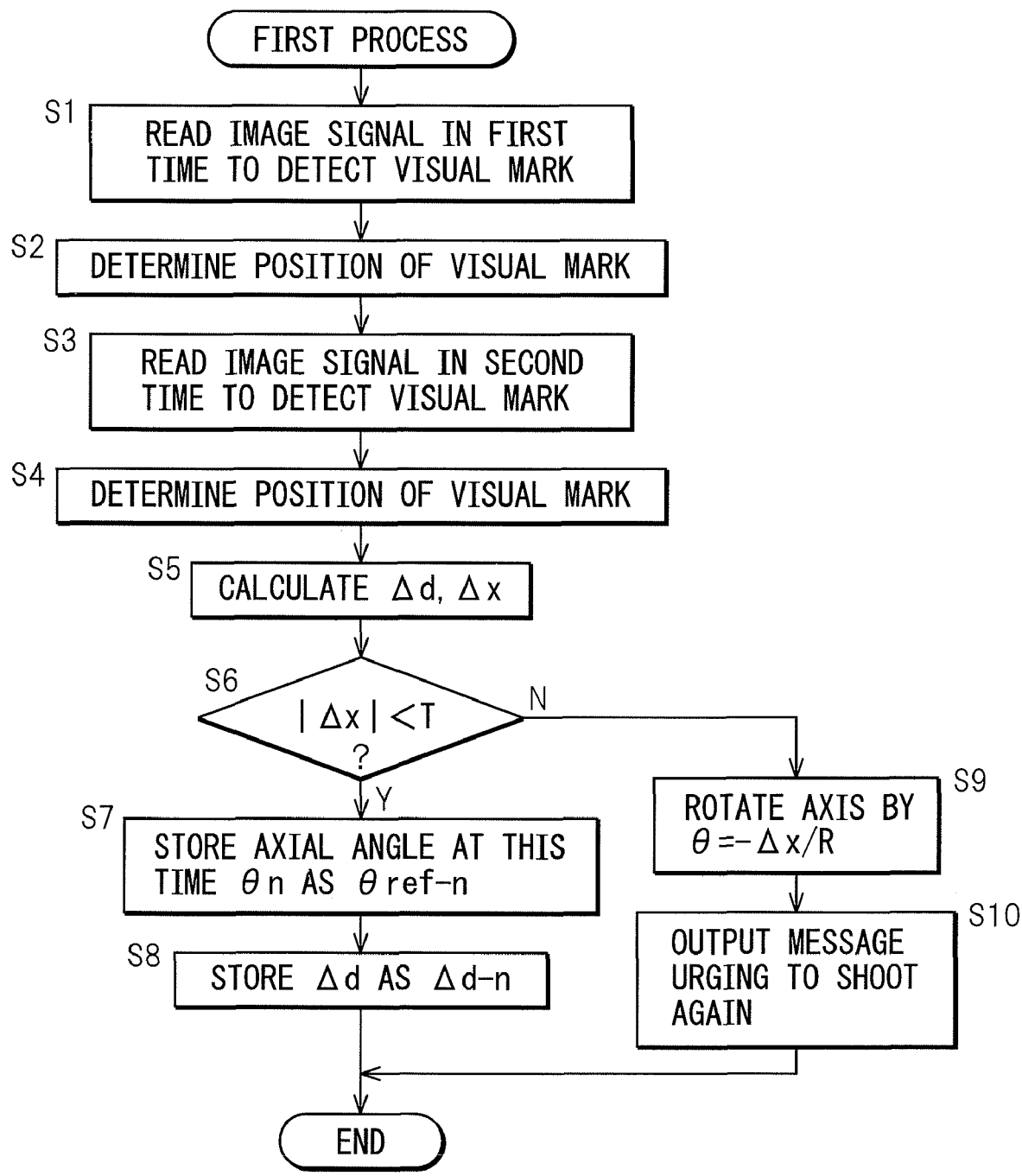
FIG. 8 is a flowchart illustrating an example of a first process carried out in a first processing section of the robot controller of FIG. 2.

FIG. 8 is a flowchart illustrating a first process carried out in a first processing section 5a of robot controller 5 (FIG. 3) after the two imaging at the first time. The process illustrated in this flowchart is started automatically, for example, before replacing the motor and immediately after the second imaging is carried out with camera 4.

In step S1, the image signal of visual mark 30 imaged by camera 4 at the first time is read to detect visual mark 30 on the image. More specifically, in step S1, a predetermined command is output from robot controller 5 to image processor 2 via communication interface 14 so that image processor 2 detects visual mark 30. The signals detected by image processor 2 are sent to robot controller 5 via communication interface 14. In step S2, based on this detected signals, the position of visual mark 30 is determined. Specifically, the direction and distance of the line of sight from the lens center to visual mark 30 are calculated. In this regard, the description will be made below, on the assumption that the articulation part is imaged as illustrated in FIG. 9A. FIG. 9B is a diagram viewed from arrow v in FIG. 9A, and illustrates a positional relationship between visual mark 30 and the lens center. In this case, the description will be made below, on the assumption that there is a step height between support member 31 and movable member 32 in the direction perpendicular to the sheet.

In FIG. 9B, dot marks P2 to P5 on support member 31 are located on an identical plane. Dot mark P5 is hidden by dot mark P3. There is a known distance A between dot mark P2 and dot mark P3 and between dot mark P3 and dot mark P4, respectively. On the other hand, dot mark P1 on movable member 32 is located at a height different from that of dot marks P2 to P5 by an unknown distance Δd, or a step height. Visual mark 30 is imaged after movable member 32 is rotated so as to align vertical dot marks P1, P3 and P5 in one line. However, because dot mark P1 is not accurately positioned in the rotational direction of movable member 32, dot mark P1 is apart from dot mark P3 in the axial rotational direction by an unknown distance Δx. Furthermore, it is assumed that lens center Q is substantially located on a plane that passes through P2, P3 and P4 and that is perpendicular to the sheet in FIG. 9A.

Camera 4 is calibrated in advance and, in step S2, based on the relationship of the above equation (II), directions of lines of sight L1 to L4 from lens center Q to dot marks P1 to P4 are calculated. As a result, an angle Θ1 between lines of sight L2 and L3, an angle Θ2 between lines of sight L3 and L4 and an angle Φ between lines of sight L1 and L3 in FIG. 9B are calculated, respectively.

Furthermore, by using the calculated angles Θ1 and Θ2, distances c1, b and c2 from the lens center to dot marks P2, P3 and P4 are calculated, respectively. In this case, between angles Θ1 and Θ2 and distances c1, b and c2, the following equations (III), (IV) and (V) hold:

$$A^2 = b^2 + c1^2 - 2b \cdot c1 \cdot \cos \Theta 1 \quad \text{(III)}$$

$$A^2 = b^2 + c2^2 - 2b \cdot c2 \cdot \cos \Theta 2 \quad \text{(IV)}$$

$$c1 \sin \Theta 1 = c2 \cdot \sin \Theta 2 \quad \text{(V)}$$

By simultaneously solving the above equations (III), (IV) and (V), c1, b and c2 can be calculated. As a result, relative positions of dot marks P2 to P4 relative to lens center Q can be identified, and a relative relationship between line of sight L1 from lens center Q to dot mark P1 and dot marks P2 to P4 can be determined. In this case, with respect to P1, only a direction of line of sight L1 can be determined. That is, in this step, values (Δd, Δx) representing the position of P1 cannot be identified.

In step S3, the image signal of visual mark 30 imaged by camera 4 in the second time is read to detect visual mark 30 on the image. Details of this procedure are similar to those in step S1. In step S4, based on this detected signal, the position of visual mark 30 is determined. Specifically, similarly to step S2, the line of sight from the lens center to visual mark 30 is calculated, and then, a relative relationship between line of sight L1 from the lens center to dot mark P1 and dot marks P2, P3 and P4 is determined. In step S5, if a point of intersection of line of sight L1 determined in step S2 and line of sight L1 determined in step S4 is defined as P1, position of the intersection point P1 is calculated, and a position of the intersection point P1 relative to P2, P3 and P4 is determined (the principle of stereo vision). As a result, values of Δd and Δx in FIG. 9B can be calculated.

In step S6, it is determined whether an absolute value of Δx is smaller than a predetermined allowable value T or not. Allowable value T specifies a maximum deviation of P1 relative to P3 in the axial rotational direction, and T is set to, for example, a value substantially close to zero. If a negative decision is made in step S6, the process proceeds to step S9.

In step S9, a control signal is output to servo motor M to rotate the articulation axis by −Δx/R. R is a distance from a center of the articulation axis to dot mark P1 (a radius of rotation), and it may be a design value or an actual measured value. As the actual measured value, for example, by using the fact that Δx can be determined according to the principle of stereo vision, Δx1 when the angle of the articulation axis is θ1, and Δx2 when the angle of the articulation axis is θ2 can be determined, respectively, and then, R can be determined according to the equation: R=(Δx1−Δx2)/(θ1−θ2).

In step S9, if the articulation axis is rotated by—Δx/R, the positional relationship of dot mark P1 relative to dot marks P2 to P4 is changed so that deviation Δx of P1 with respect to P3 in the axial rotational direction is reduced. Consequently, in step S10, a control signal is output to the monitor to display a message urging the user to shoot visual mark 30, and then, the first process is terminated. As a result, the operator shoots visual mark 30 with camera 4 again, and the first process is carried out again.

On the other hand, in step S6, if it is determined that the absolute value of Δx is smaller than T, it is considered that the vertical row of the dot marks in visual mark 30 are aligned accurately in one line, and the process proceeds to step S7. In step S7, the axial angle θ depending on the sensor signal at this time is stored in the memory as θref-n. In this connection, n is an index indicating that it is a value of the n-th articulation axis. Next, in step S8, Δd calculated in step S5 is stored in the memory as a step height Δd-n of visual mark 30 of the n-th articulation axis, and the first process is terminated.

Figure 10:
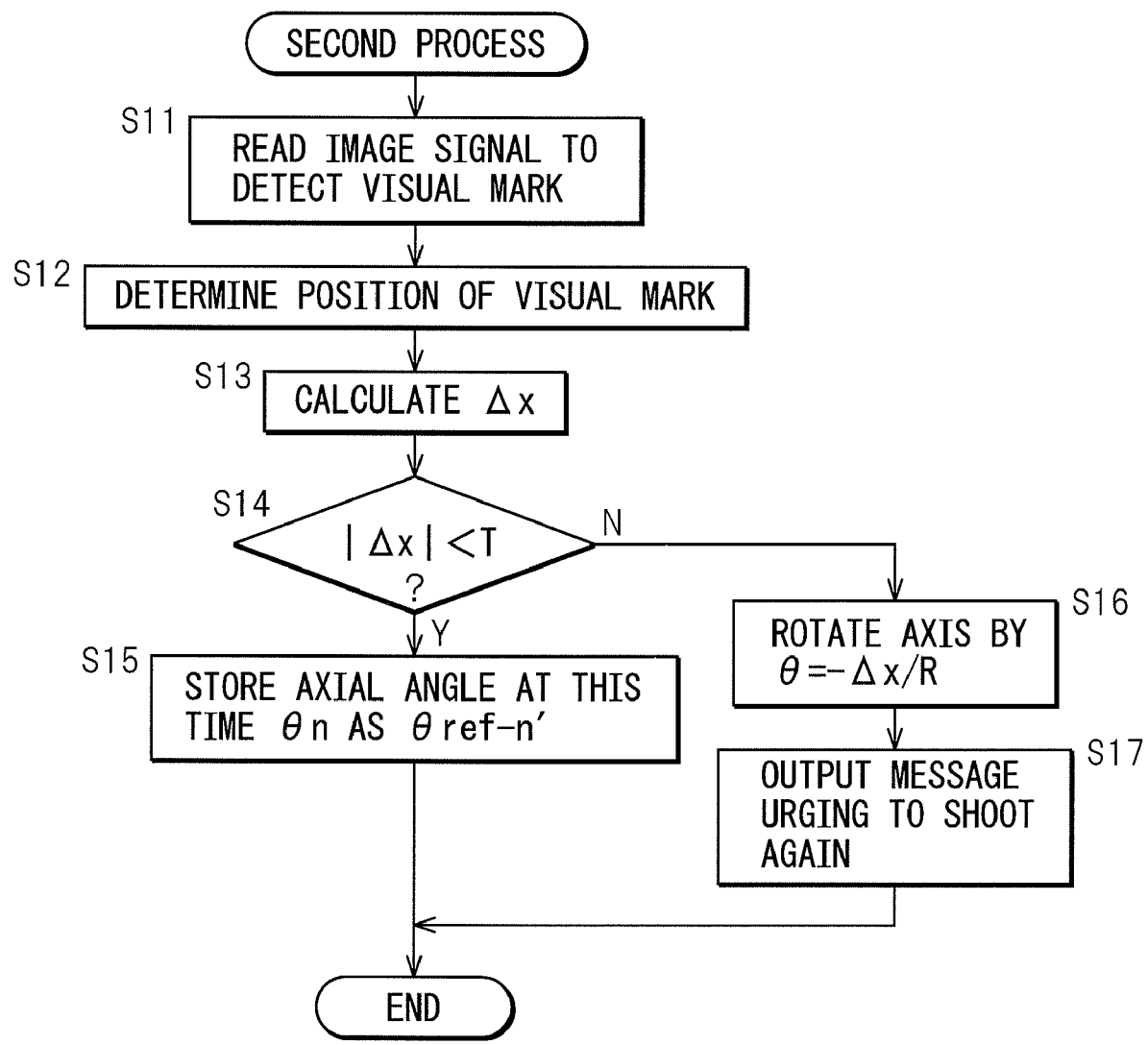
FIG. 10 is a flowchart illustrating an example of a second process carried out in a second processing section of the robot controller of FIG. 2.

FIG. 10 is a flowchart illustrating a second process performed by a second processing section 5b of robot controller 5 (FIG. 3) after imaging visual mark 30 at the second time. The process illustrated in this flowchart is started automatically, for example, after replacing the motor and immediately after the imaging with camera 4 is carried out.

In step S11, the image signal of visual mark 30 taken with camera 4 at the second time is read to detect visual mark 30 on the image. More specifically, in step S11, a predetermined command is output from robot controller 5 to image processor 2 via communication interface 14 so that image processor 2 detects visual mark 30. The signals detected by image processor 2 are sent to robot controller 5 via communication interface 14.

Figure 11:
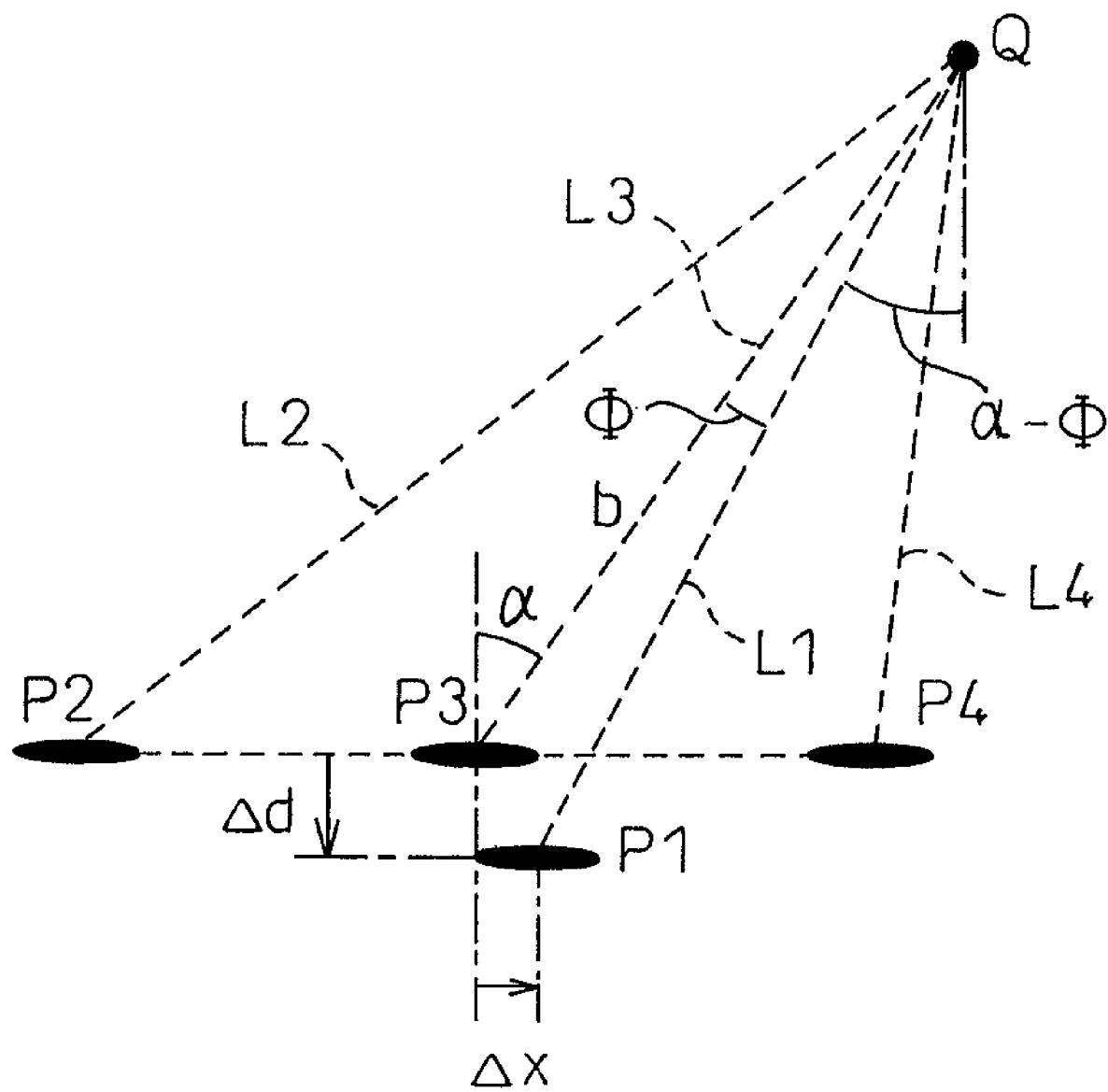
FIG. 11 is a diagram describing a specific technique for the second process of FIG. 10.

In step S12, based on this detected signals, the position of visual mark 30 is determined. That is, similarly to step S2 described above, the direction and distance of the line of sight from the lens center to visual mark 30 are calculated. More specifically, as illustrated in FIG. 11, an angle α between a normal line to a line segment interconnecting dot marks P2 to P4 and line of sight L3 from Q to P3, and an angle Φ between line of sight L3 and line of sight L1 from Q to P1 are calculated, respectively, and further, a distance b from Q to P3 is calculated. The distance b can be calculated by carrying out the process similar to that for calculating c1, b and c2 in step S2 described above. In step S12, similarly to step S2, it is assumed that lens center Q is substantially located on a plane that passes through P2, P3 and P4 and that is perpendicular to the sheet of FIG. 9A.

In step S13, by using Δd stored in the memory as a result of the process described above (step S8) and the angles α, Φ and the distance b determined in step S12, deviation Δx of P1 relative to P3 in the axial rotational direction (FIG. 11) is calculated according to the following equation (VI):

$$\Delta x = b \sin \alpha - (b \cos \alpha + \Delta d)\tan(\alpha - \Phi) \quad \text{(VI)}$$

Next, in step S14, similarly to step S6, it is determined whether an absolute value of Δx is smaller than a predetermined allowable value T or not. If negative decision is made in step S14, the process proceeds to step S16. In step S16, similarly to step S9, a control signal is output to servo motor M to rotate the articulation axis by −Δx/R. Next, in step S17, a control signal is output to the monitor to display a message urging the user to obtain the image again with camera 4, and the second process is terminated. As a result, the operator obtains the image visual mark 30 again, and then, the second process is carried out again.

On the other hand, in step S14, if it is determined that the absolute value of Δx is smaller than T, it is considered that the vertical row of the dot marks (P1, P3 and P5) in visual mark 30 are aligned accurately in one line and the process proceeds to step S15. In step S15, the axial angle θ depending on the sensor signal at this time is stored in the memory as θref-n', and the second process is terminated.

Once the second process is terminated, after that, correction section 5c of robot controller 5 (FIG. 3) uses the axial angles θref-n and θref-n' stored in the memory to correct the axial angle θn of the n-th axis depending on the sensor signal according to the following equation (VII):

$$\theta n - (\theta\text{ref-}n' - \theta\text{ref-}n) \rightarrow \theta n \quad \text{(VII)}$$

The above equation (VII) means that the reference value of the axial angle θn is deviated by (θref-n'−θref-n). As a result, the zero point is validated. Therefore, when θn=0, the robot mechanism part takes the same orientation as that before replacing the motor.

That is, the axial angle θn depending on the sensor signal based on the reference position is restored.

Figure 12:
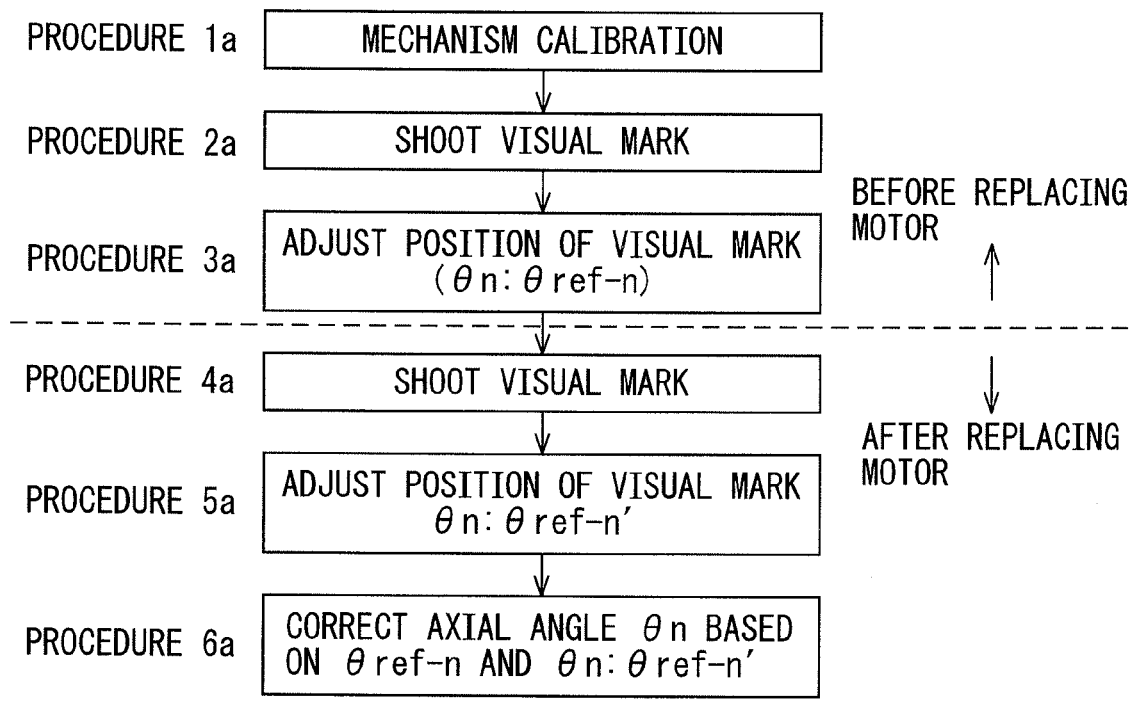
FIG. 12 is a diagram illustrating a procedure of a method for restoring positional information according to a first embodiment of the present invention.

The method for restoring positional information according to the first embodiment is summarized as follows. First, as illustrated in FIG. 12, in procedure 1a, the mechanism calibration is carried out to determine a correlation between the sensor signal with respect to the zero point of the articulation axis and the axial angle θn. Next, in procedure 2a, at the first time before carrying out the replacement of the motor and the like, a driving command is manually output to servo motor M to rotate the articulation axis so that the vertical row (P1, P3 and P5) of visual mark 30 are aligned substantially in one line. Then, a region including this visual mark 30 is shot with camera 4 (the first shooting procedure). Further, in procedure 3a, the positional relationship between dot marks P1 to P5 at the first time is calculated based on the imaging signals from camera 4. Then, servo motor M is controlled and the position of visual mark 30 is adjusted so that dot marks P1, P3 and P5 are aligned accurately in one line within the allowable value T (the first motor control procedure). The axial angle θref-n depending on the sensor signal at this time is stored in the memory.

After that, once the replacement of the motor and the like is carried out, in procedure 4a, at the second time after replacing the motor, a driving command is manually output to servo motor M to rotate the articulation axis so that the vertical row (P1, P3 and P5) of visual mark 30 are aligned substantially in one line. Then, a region including this visual mark 30 is shot with camera 4 (the second shooting procedure). Next, in procedure 5a, the positional relationship between dot marks P1 to P5 at the second time is calculated based on the imaging signals from camera 4. Then, servo motor M is controlled and the position of visual mark 30 is adjusted so that dot marks P1, P3 and P5 are aligned accurately in one line within the allowable value T (the second motor control procedure).

Lastly, in procedure 6a, based on the axial angle θref-n' depending on the sensor signal at this time and the axial angle θref-n stored in the memory before replacing the motor, the axial angle θn depending on the sensor signal is corrected (the correction procedure).

According to the first embodiment, the following effects can be exhibited:

(1) Before and after replacing the motor, visual mark 30 is shot with camera 4, and servo motor M is controlled based on the image signals from camera 4 so that the positional relationships of visual mark 30 before and after replacing the motor are identical to each other. Then, based on the axial angles θref-n and θref-n' corresponding to the sensor signal after controlling the motor, the axial angle θn depending on the sensor signal after replacing the motor is corrected. As a result, the cumbersome positioning work to the reference position of the articulation axis becomes unnecessary, and the positional information depending on the sensor signal with respect to the zero point, which is invalidated by the replacement of the motor, can be easily validated.

Figure 13A:
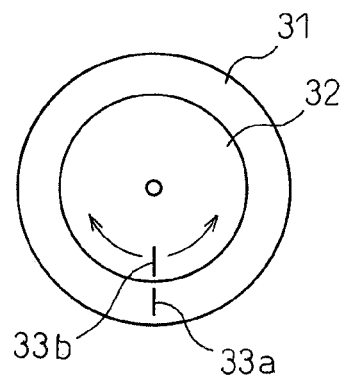
FIG. 13A is a diagram illustrating a comparative example of FIG. 5A.
Figure 13B:
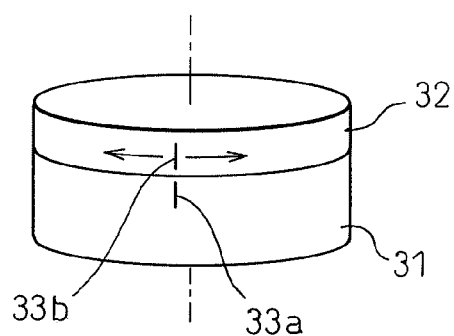
FIG. 13B is a diagram illustrating a comparative example of FIGS. 5B and 6A to 6C.

In other words, in this embodiment, visual mark 30 is positioned by using the image signal from camera 4. This positioning work takes less effort and is easier than the positioning by using the pins inserted into the articulation part or the positioning by using the V-shaped groove and the proximity sensor provided therein. Furthermore, in a method in which mark-off lines 33a and 33b are formed on support member 31 and movable member 32, respectively, and the positioning is carried out visually so that both mark-off lines 33a and 33b coincide as illustrated in FIGS. 13A and 13B, positioning error is likely to occur depending on a direction in which the operator sees mark-off lines 33a and 33b, and positioning accuracy relies on the operator's skill. In contrast to this, in this embodiment, visual mark 30 can be positioned accurately and not relying on the operator's skill.

(2) The positioning of visual mark 30 can be carried out at an arbitrary position so long as it is carried out at the same position before and after replacing the motor. Consequently, the positioning can be carried out without rotating the articulation axis to the reference position where the zero point is set, and therefore, flexibility of the positioning is improved.

(3) By changing the position or orientation of camera 4 before replacing the motor, identical visual mark 30 is shot a plurality of times. Consequently, even when there is a step height or the like between support member 31 and movable member 32, visual mark 30 can be positioned accurately.

(4) The shooting of visual mark 30 only once after the replacement of the motor is sufficient. Consequently, the user can validate the positional information depending on the sensor signal with little effort and, as a result, a burden on the user can be reduced.

Second Embodiment

Figure 14:
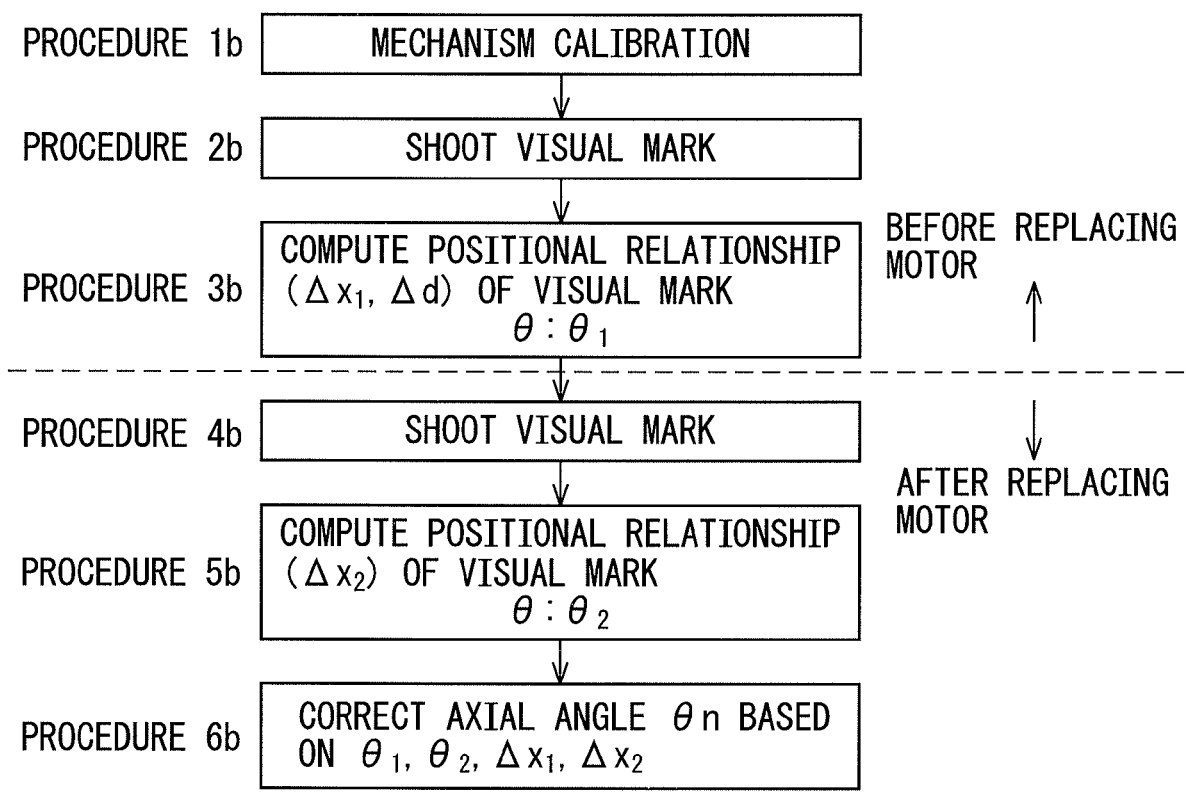
FIG. 14 is a diagram illustrating a procedure of a method for restoring positional information according to a second embodiment of the present invention.
Figure 15:
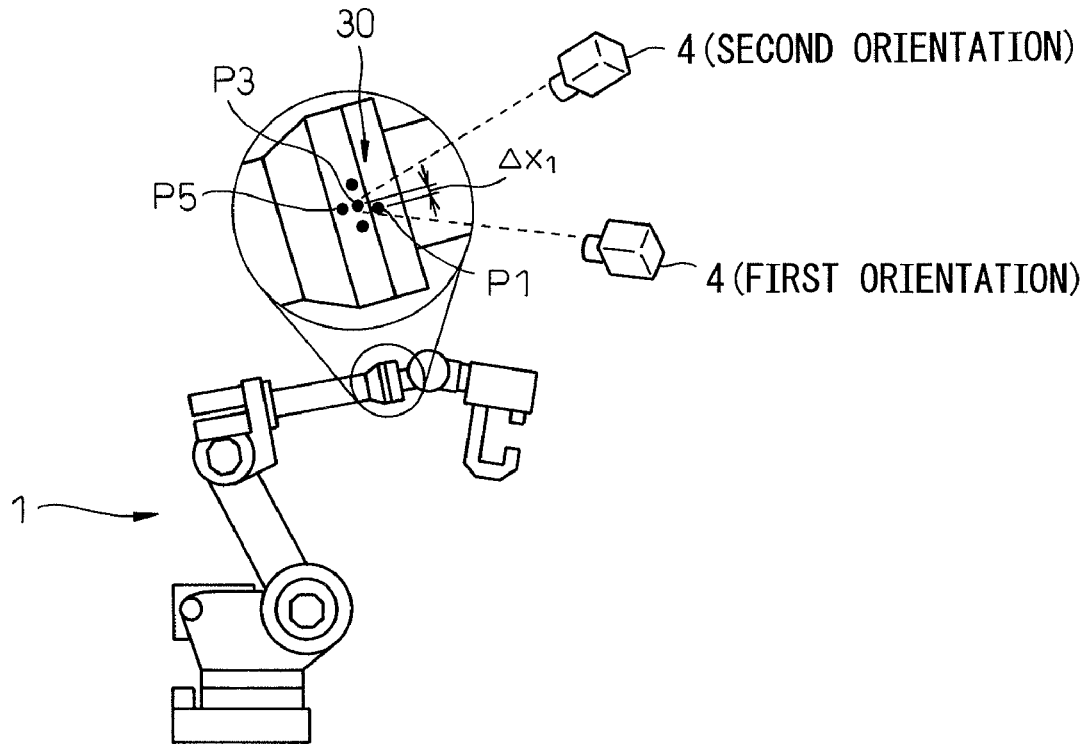
FIG. 15 is a diagram illustrating the imaging operation before replacing the motor by the method for restoring positional information according to the second embodiment of the present invention.
Figure 16:
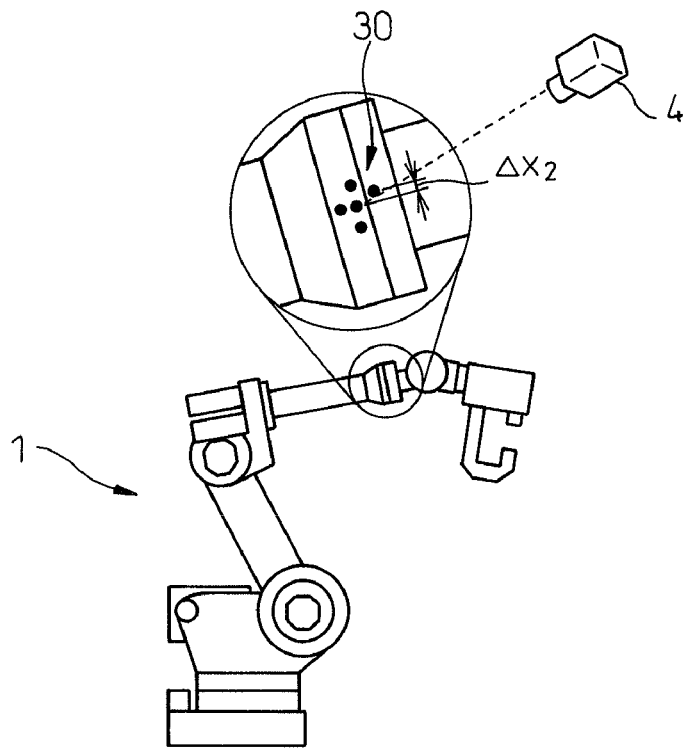
FIG. 16 is a diagram illustrating the image capture operation after replacing the motor by the method for restoring positional information according to the second embodiment of the present invention.

Referring to FIGS. 14-16, a second embodiment of the present invention will be described. In the first embodiment, before and after the replacement of the motor and the like, visual mark 30 is positioned based on the image signal from camera 4, and then, based on the sensor signal after this positioning, the positional information depending on the sensor signal is corrected. On the other hand, in the second embodiment, without positioning visual mark 30, based on the position of visual mark 30 before and after the replacement of the motor and the like, the positional information depending on the sensor signal is corrected. Elements identical to those in the first embodiment are designated by the same reference numerals, and hereinafter, differences from the first embodiment will be mainly described.

FIG. 14 is a diagram illustrating a procedure of a method for restoring positional information according to the second embodiment of the present invention. In the second embodiment, first, in procedure 1b, similarly to the first embodiment, the mechanism calibration is carried out. Next, at the first time before replacing the motor, in procedure 2b, a driving command is manually output to servo motor M to rotate the articulation axis so that the vertical row (P1, P3 and P5) of visual mark 30 are aligned substantially in one line. Then, a region including this visual mark 30 is shot with camera 4 (the first shooting procedure).

In this case, as illustrated in FIG. 15, while the position of visual mark 30 is fixed, camera 4 is held in a first orientation to shoot visual mark 30 and, further, camera 4 is held in a second orientation to shoot visual mark 30. That is, similarly to procedure 2a (FIG. 12) of the first embodiment, changing the position and orientation of camera 4, visual mark 30 is shot a plurality of times (twice). Next, in procedure 3b, based on the image signal at this time, similarly to the first embodiment, the positional relationship of visual mark 30 at the first time or, in other words, the deviation $\Delta x1$ of dot mark P1 in the axial rotational direction relative to dot marks P3 and P5 and the step height $\Delta d$ between P3 and P1 (a difference of elevation between P3 and P1 in the direction perpendicular to the sheet of FIG. 15) are computed (the first computation procedure). The computed $\Delta x1$ and $\Delta d$ as well as the axial angle θ1 depending on the sensor signal are stored in the memory.

After that, once the replacement of the motor and the like is carried out, in procedure 4b, at the second time after replacing the motor, a driving command is manually output to servo motor M to rotate the articulation axis so that the vertical row (P1, P3 and P5) of visual mark 30 are aligned substantially in one line. Then, as illustrated in FIG. 16, a region including this visual mark 30 is shot with camera 4 (the second shooting procedure). Next, in procedure 5b, based on the image signal at this time, and by using $\Delta d$ stored in the memory at the first time, the positional relationship of visual mark 30 in the second moment or, in other words, the deviation $\Delta x2$ of dot mark P1 in the axial rotational direction relative to dot marks P3 and P5 is computed (the second computation procedure). The axial angle depending on the sensor signal at this time is θ2.

Lastly, in procedure 6b, by using the computed $\Delta x2$, the axial angle θ2 depending on the sensor signal, $\Delta x1$ and θ1 stored in the memory at the first time, and the distance R from the center of the articulation axis to dot mark P1, the axial angle θn depending on the sensor signal is corrected according to the following equation (VIII) (the correction procedure):

$$\theta n - (\theta 2 - \theta 1) + (\Delta x2 - \Delta x1)/R \rightarrow \theta n \qquad \text{(VIII)}$$

Among the above procedures, the computation of the positional relationship of visual mark 30 in procedure 3b is carried out by first processing section 5a of robot controller 5, the computation of the positional relationship of visual mark 30 in procedure 5b is carried out by second processing section 5b, and the correction of the axial angle θn is carried out by correction section 5c. In this case, first processing section 5a and second processing section 5b may perform the processes similar to those described with reference to FIGS. 8 and 10, respectively, the specific description of which is omitted.

According to the second embodiment, before and after the replacement of the motor and the like, visual mark 30 is imaged by camera 4 and, based on the image signal from camera 4, the variation $(\Delta x2-\Delta x1)/R$ of the actual axial angle $\theta$ is calculated. Then, based on this variation and the variation $(\theta 2-\theta 1)$ of the axial angle depending on the sensor signal, the axial angle $\theta$n depending on the sensor signal after replacing the motor is corrected. As a result, the positional information depending on the sensor signal with reference to the zero point, which is invalidated by the replacement of the motor and the like can be easily validated. Further, in contrast to the first embodiment, it is not necessary to control servo motor M to position visual mark 30. Consequently, the restoration work of the positional information can be easily carried out.

In the embodiments described above, the positional relationship between support member 31 and movable member 32 is represented by dot marks P1-P5. However, so long as they can be recognized by camera 4, a first marks (P2 to P5) and a second mark P1 representing their mutual positional relationship may have any shapes. An imaging section may obtain the image signal not via a CCD but via a CMOS. In the embodiments described above, the positional relationship of visual mark 30 before replacing the motor (the first positional relationship) is computed by the process (steps S1 to S5) in first processing section 5a, and the positional relationship of visual mark 30 after replacing the motor (the second positional relationship) is computed by the process (steps S11 to S13) in second processing section 5b. However, the configuration of a mark position computation section is not limited to that described above.

In the first embodiment, after visual mark 4 is shot before and after the replacement of the motor, servo motor M is controlled so that the vertical low of dot marks P1, P3 and P5 are aligned in one line (steps S9 and S16). However, servo motor M may be controlled so that visual mark 30 has any other predetermined relationship, and the configuration of first processing section 5a and second processing section 5b as a motor control section is not limited to that described above. The axial angle $\theta$n after the second time is corrected, based on the axial angle $\theta$ref-n depending on the sensor signal after controlling the motor at the first time before replacing the motor, and the axial angle $\theta$ref-n' depending on the sensor signal after controlling the motor at the second time after replacing the motor. However, so long as the axial angle $\theta$n is corrected based on the sensor signal after controlling the motor at the first time (the first sensor signal) and the sensor signal after controlling the motor at the second time (the second sensor signal), the configuration of correction section 5c is not limited to that described above.

In the second embodiment, so long as the variation of the axial angle $\theta$n (the relative movement of movable member 32 relative to support member 31) between the first time and the second time is computed, based on the positional relationship of visual mark 30 at the first time before replacing the motor (FIG. 15) and the positional relationship of visual mark 30 at the second time before replacing the motor (FIG. 16), and the axial angle $\theta$n is corrected based on this variation, the sensor signal at the first time (a first sensor signal) and the sensor signal at the second time (a second sensor signal), the configuration of correction section 5c is not limited to that described above.

In the first and second embodiments, the correlation between the sensor signal and the axial angle $\theta$n of the articulation axis is determined by the mechanism calibration. After that, $\theta$n based on the reference position, which is invalidated due to the removal or replacement of servo motor M, reduction gear or the like, is validated by the correction, based on the sensor signal after controlling the motor at the first time and the sensor signal after controlling the motor at the second time or based on the variation of $\theta$n, the sensor signal at the first time and the sensor signal at the second time. However, also when other component that affects the correlation between the sensor signal and the axial angle $\theta$n is removed or replaced, $\theta$n can be validated by correcting $\theta$n similarly. The axial angle $\theta$n is validated as the positional information depending on the sensor signal based on the reference position. However, other positional information may be validated.

In the embodiments described above, in order to determine the positional relationship of visual mark 30, at the first time before replacing the motor, visual mark 30 is shot twice at different positions or orientations of the camera. However, when $\Delta$d is known in advance, the shooting may be carried out at the first time only once. In order to improve calculation accuracy of the positional relationship of visual mark 30, visual mark 30 may be shot three times or more.

Movable member 32 is moved relative to support member 31 by servo motor M. However, other motor may be used. So long as the sensor signal depending on the motor driving amount is output, a sensor other than pulse coder PC may be used. So long as the robot includes support member 31 (a first member) and movable member 32 (a second member) that are movable relative to each other via the articulation axis and that are driven by the motor, the present invention can be similarly applied to the other robot.

Thus, the configuration of a positional information validation section 100 validating the positional information depending on the sensor signal based on the reference position, wherein after the correlation between the sensor signal and the relative movement of the second member relative to the first member is determined with respect to the reference position of the articulation position, the positional information is invalidated for a reason that a component affecting this correlation is removed or replaced, is not limited to that described above.

According to the present invention, based on the image signal of the first mark and the second mark representing the positional relationship between the first member and the second member before and after the replacement of the motor and the like, the positional information depending on the sensor signal based on the reference position is corrected. Consequently, the positional information that is invalidated as a result of the replacement of the motor and the like can be easily validated.

While the present invention has been described with reference to specific preferred embodiments, it will be understood, by those skilled in the art, that various modifications and changes may be made thereto without departing from the scope of the following claims.

The invention claimed is:

1. A device for restoring positional information of a robot provided with a first member and a second member connected in a manner movable relative to each other via an articulation axis; a motor moving the second member relative to the first member; and a sensor outputting a sensor signal according to a driving amount outputting a sensor signal according to a driving amount of the motor, the device being capable of validating positional information depending on the sensor signal based on a reference position of the articulation axis, the positional information is invalidated for a reason that a component affecting a correlation between the sensor signal and a relative movement of the second member relative to the first member is removed or replaced after the correlation is determined with respect to the reference position, wherein the first member and the second member are provided with a first mark and a second mark, respectively, the first mark and the second mark representing a positional relationship between the first member and the second member; and wherein the device comprises:
an imaging section obtaining an image signal in a region including the first mark and the second mark;
a mark position computation section computing a first positional relationship between the first mark and the second mark at a first time before the component is removed or replaced, based on an image signal obtained by the imaging section at the first time, and computing a second positional relationship between the first mark and the second mark at a second time after the component is removed or replaced, based on an image signal obtained by the imaging section at the second time;
a motor control section controlling the motor at the first time so that the first positional relationship computed by the mark position computation section becomes a predetermined positional relationship, and controlling the motor at the second time so that the second positional relationship computed by the mark position computation section becomes the predetermined positional relationship; and
a correction section correcting positional information depending on a sensor signal output by the sensor after the second time, based on a first sensor signal output by the sensor after the motor is controlled by the motor control section at the first time and a second sensor signal output by the sensor after the motor is controlled by the motor control section at the second time.

2. A device for restoring positional information of a robot provided with a first member and a second member connected in a manner movable relative to each other via an articulation axis; a motor moving the second member relative to the first member; and a sensor outputting a sensor signal according to a driving amount of the motor,
the device being capable of validating positional information depending on the sensor signal based on a reference position of the articulation axis, the positional information is invalidated for a reason that a component affecting a correlation between the sensor signal and a relative movement of the second member relative to the first member is removed or replaced after the correlation is determined with respect to the reference position;

wherein the first member and the second member are provided with a first mark and a second mark, respectively, the first mark and the second mark representing a positional relationship between the first member and the second member; and wherein the device comprises:
an imaging section obtaining an image signal in a region including the first mark and the second mark;
a mark position computation section computing a first positional relationship between the first mark and the second mark at a first time before the component is removed or replaced, based on an image signal obtained by the imaging section at the first time, and computing a second positional relationship between the first mark and the second mark at a second time after the component is removed or replaced, based on an image signal obtained by the imaging section at the second time; and
a correction section computing a positional variation of the second member relative to the first member between the first time and the second time, based on the first positional relationship and the second positional relationship computed by the mark position computation section, and correcting the positional information depending on a sensor signal output by the sensor after the second time, based on this positional variation, a first sensor signal output by the sensor at the first time, and a second sensor signal output by the sensor at the second time.

3. A method for restoring positional information of a robot having a first member and a second member connected in a manner movable relative to each other via an articulation axis; a motor moving the second member relative to the first member; and a sensor outputting a sensor signal according to a driving amount of the motor, adapted to validate positional information depending on the sensor signal based on a reference position of the articulation axis, the positional information is invalidated for a reason that a component affecting a correlation between the sensor signal and a relative movement of the second member relative to the first member is removed or replaced after the correlation is determined with respect to the reference position, wherein the first member and the second member are provided with a first mark and a second mark, respectively, the first mark and the second mark representing a positional relationship between the first member and the second member; and wherein the methods includes:
a first shooting procedure for shooting a region including the first mark and the second mark with a camera, at a first time before the component is removed or replaced;
a first motor control procedure for computing a first positional relationship between the first mark and the second mark at the first time, based on an image signal obtained in the first shooting procedure, and controlling the motor so that the first positional relationship becomes a predetermined positional relationship;
a second shooting procedure for shooting a region including the first mark and the second mark with a camera, at a second time after the component is removed or replaced;
a second motor control procedure for computing a second positional relationship between the first mark and the second mark at the second time, based on an image signal obtained in the second shooting procedure, and controlling the motor so that the second positional relationship becomes a predetermined positional relationship; and
a correction procedure for correcting positional information depending on a sensor signal output by the sensor after the second time, based on a first sensor signal output by the sensor after the motor is controlled in the first motor control procedure, and a second sensor signal output by the sensor after the motor is controlled in the second motor control procedure.

4. The method of claim 3, wherein, in the first shooting procedure, a position or an orientation of the camera is changed, and at each position or orientation, the region including the first mark and the second mark is shot.

5. A method for restoring positional information of a robot having a first member and a second member connected in a manner movable relative to each other via an articulation axis; a motor moving the second member relative to the first member; and a sensor outputting a sensor signal according to a driving amount of the motor, adapted to validate positional information depending on the sensor signal based on a reference position of the articulation axis, the positional information is invalidated for a reason that a component affecting a correlation between the sensor signal and a relative movement of the second member relative to the first member is removed or replaced after the correlation is determined with respect to the reference position;

wherein the first member and the second member are provided with a first mark and a second mark, respectively, the first mark and the second mark representing a positional relationship between the first member and the second member; and wherein the method includes:

a first shooting procedure for shooting a region including the first mark and the second mark with a camera, at a first time before the component is removed or replaced;

a first computation procedure for computing a first positional relationship between the first mark and the second mark at the first time, based on an image signal obtained in the first shooting procedure;

a second shooting procedure for shooting a region including the first mark and the second mark with a camera, at a second time after the component is removed or replaced;

a second computation procedure for computing a second positional relationship between the first mark and the second mark at the second time, based on an image signal obtained in the second shooting procedure; and a correction procedure for computing a relative movement of the second member relative to the first member between the first time and the second time, based on the first positional relationship computed in the second computation procedure, and the, correcting positional information depending on a sensor signal output by the sensor after the second time, based on this relative movement, a first sensor signal output by the sensor at the first time, and a second sensor signal output by the sensor at the second time.

6. The method of claim 5, wherein in the first shooting procedure, a position or an orientation of the camera is changed, and at each position or orientation, the region including the first mark and the second mark is shot.

\* \* \* \* \*